United States Patent
Lo Presti et al.

(10) Patent No.: US 7,479,196 B2
(45) Date of Patent: Jan. 20, 2009

(54) METHOD FOR MANUFACTURING OR RETREADING A PNEUMATIC TIRE

(75) Inventors: Gaetano Lo Presti, Sesto San Giovanni (IT); Rodolfo Noto, Gorgonzola (IT)

(73) Assignee: Pirelli Pneumatici S.p.A., Milan (IT)

( * ) Notice: Subject to any disclaimer, the term of this patent is extended or adjusted under 35 U.S.C. 154(b) by 68 days.

(21) Appl. No.: 10/503,309

(22) PCT Filed: Feb. 19, 2002

(86) PCT No.: PCT/IT02/00100

§ 371 (c)(1),
(2), (4) Date: May 17, 2005

(87) PCT Pub. No.: WO03/070454

PCT Pub. Date: Aug. 28, 2003

(65) Prior Publication Data

US 2005/0205198 A1 Sep. 22, 2005

(51) Int. Cl.
*B29D 30/60* (2006.01)

(52) U.S. Cl. .................... 156/96; 156/117; 156/130

(58) Field of Classification Search ............... 156/117, 156/129, 130, 96, 397
See application file for complete search history.

(56) References Cited

U.S. PATENT DOCUMENTS

| | | | | |
|---|---|---|---|---|
| 3,268,380 A * | 8/1966 | Guichon et al. | ............. | 156/130 |
| 3,308,000 A | 3/1967 | Holman | | |
| 4,308,083 A * | 12/1981 | Toth, Jr. | ...................... | 156/129 |
| 4,551,806 A | 11/1985 | Storace et al. | | |
| 4,943,331 A * | 7/1990 | Kawabata | ................... | 156/129 |
| 6,554,041 B1 * | 4/2003 | Ohki et al. | .................. | 156/397 |
| 6,632,307 B2 * | 10/2003 | Fischer | ........................ | 156/96 |

FOREIGN PATENT DOCUMENTS

| | | |
|---|---|---|
| EP | 0 928 680 A1 | 7/1999 |
| EP | 1 033 218 A2 | 9/2000 |
| JP | 2001-179848 A * | 7/2001 |

OTHER PUBLICATIONS

Ryo Muramatsu, "Method for Manufacturing Pneumatic Tire and Pneumatic Tire", Patent Abstract of Japan of JP2001-179848, (Jul. 3, 2001).

* cited by examiner

*Primary Examiner*—Geoffrey L Knable
(74) *Attorney, Agent, or Firm*—Finnegan, Henderson, Farabow, Garrett, & Dunner, L.L.P.

(57) ABSTRACT

A method for manufacturing a tire includes forming a carcass structure, forming a tread band, placing the tire in a curing mold, and molding and curing the tire. The carcass structure includes a crown portion defined between two axially opposed sidewalls that extend radially toward an axis of rotation of the tire and terminate in a circumferential portion comprising an annular reinforcing structure for mounting the tire on a rim. The tread band extends circumferentially around the carcass structure and includes a molded relief pattern. Forming the tread band includes producing a strip of elastomeric material and winding it onto the crown portion. The strip includes an elongated right cross-section that is asymmetrical in a transverse direction. The strip is wound in a plurality of axially consecutive turns until the tread band is formed. At least one turn is at least partly overlapped onto a previously deposited, axially consecutive turn.

11 Claims, 3 Drawing Sheets

METHOD FOR MANUFACTURING OR RETREADING A PNEUMATIC TIRE

CROSS-REFERENCE TO RELATED APPLICATIONS

This application is a national-phase entry under 35 U.S.C. § 371 from International Application No. PCT/IT02/00100, filed Feb. 19, 2002, in the Italian Patent Office, the content of which is relied upon and incorporated herein by reference.

BACKGROUND OF THE INVENTION

1. Field of the Invention

The present invention relates to a method for manufacturing a pneumatic tire comprising at least one component made of an elementary semi-finished product of elastomeric material wound in consecutive overlapping turns.

2. Description of the Related Art

A tire comprises a plurality of components, made of elastomeric material possibly incorporating reinforcing elements, assembled together to form a monolithic structure shaped in a toric loop, having a crown portion and two axially opposed side walls each extending radially towards the axis of rotation of the said tire from one edge of the said crown portion. In particular, a radial tire usually comprises, firstly, a carcass containing one or more carcass plies reinforced with reinforcing cords lying in radial planes, that is planes containing the axis of rotation of the tire, and having their ends firmly attached to two annular metal cores, usually known as bead wires, forming the reinforcement of the beads, that is the radially inward edges of the said tire, the function of which is to enable the tire to be fitted to its corresponding mounting rim. On the crown of the said carcass is a thick band of elastomeric material, usually known as the tread band. Between the carcass and the tread band is a reinforcing structure usually known as the belt structure, comprising at least two radially superimposed layers of rubberized fabric containing metal reinforcing cords that run parallel with each other within each layer and lie at an angle with the cords of the adjacent layer, and preferably also a third layer of textile or metal reinforcing cords wound circumferentially, in a radially external position, at least over the edges of the underlying layers.

In addition to possessing the above components, tires intended to be used without an inner tube, also known as "tubeless" tires, are also covered internally with an airtight (that is impermeable to air) layer of elastomeric material. This airtight layer, or "liner" as it is also known, constitutes a further component of the tire of fundamental importance because the correct operation of the tire depends on its integrity over time.

It should be pointed out that, for the purposes of the present description, the term "elastomeric material" means a composition comprising at least one elastomeric polymer and at least one reinforcing filler. This composition preferably also includes additives such as crosslinking agents and/or plasticizers. Owing to the presence of the crosslinking agents, this material can be crosslinked by heating, thus forming the final product.

In conventional tire-building processes, each of the said components is made using the so-called "semi-finished" products, i.e. continuous sheets of elastomeric material prepared separately and in large quantities before the tire itself is made. If composed of the elastomeric material only, these sheets may have a right cross section of variable profile and thickness, whereas if they include reinforcing elements, especially cords, their thickness is largely uniform and they take the name of rubberized fabrics.

The aforesaid "semi-finished" products are collected in special containers, such as reels, and are stored while awaiting assembly on the tire.

The building process that employs these semi-finished products usually consists of a series of successive steps carried out by winding, at each appropriate stage, a particular sheet onto a building drum, cutting (or in some cases pre-cutting) the said sheet into a length approximately equal to the circumference of the drum, and joining the circumferentially opposite ends of the said sheet length directly on the said building drum.

In more recent times particular attention has been given to the search for production methods that would eliminate or at least reduce the preliminary production of semi-finished products that are later used during tire building. For example, as explained in European patent application EP 928 680 by this Applicant, a tire is formed directly on a toroidal support by forming axially overlapping and/or radially superimposed turns of an elementary semi-finished product of suitable dimensions wound on the said support immediately subsequent to its own manufacture. In particular, three different types of elementary semi-finished products are used, viz.: a profile of elastomeric material only, essentially of rectangular section, hereinafter referred to as "strip"; a tape of elastomeric material containing long embedded reinforcing elements, typically textile or metal cords, hereinafter termed "strip-like element"; and rubberized plain metal wires or cords.

In this technology, each component made of elastomeric material only, such as the liner, side walls, fillers and tread band, is formed by winding successive axially adjacent, optionally radially superimposed turns of the said strip onto the said toroidal support.

More precisely, this winding action involves a relative displacement in the axial direction between the said toroidal support, which is turned about an axis coinciding with the axis of rotation of the developing tire, and an output die of an extruder extruding the said strip.

SUMMARY OF THE INVENTION

The Applicant has observed that, if a tread band is to be made, optimum moulding of the relief pattern in the said band during the tire curing process requires that the elastomeric material of the band be distributed with an axially variable thickness that is greater roughly in the hollows and less in the solids of the moulding matrix. However, it proves difficult to achieve this thickness variation with the normal elastomeric strip of roughly rectangular section, during a single relative axial displacement in the same direction along the peripheral line of the right cross section of the toroidal support, between the said toroidal support and the said output die.

Specifically, several relative axial displacements must be made in both directions, even if necessary interrupting the delivery of the strip into sections, which of course complicates the process and lengthens the tire building process.

The Applicant has observed that, by suitably modifying the right cross section of the said strip, it is possible to carry out a method of manufacturing a tire that produces a green tire in which the radially outer surface of the tread band substantially matches the curing mould, by depositing the said strips in a single relative axial displacement, in the same direction along the peripheral line of the right cross section of the toroidal support, between the said toroidal support and the said output die.

The Applicant has found that shaping of the right cross section of the said strip to make it elongate and asymmetrical in the transverse direction makes it possible to produce a tire in which a tread band whose thickness can be varied at will in the axial direction is produced by the said single relative displacement between the said toroidal support and the said output die, by spiralling the said strip in consecutively deposited turns that at least partly overlap at their edges.

In its first aspect the invention relates to a method for manufacturing a pneumatic tire comprising a toroidal carcass structure having a crown portion defined between two axially opposed side walls that extend radially towards the axis of rotation of the said tire and terminate in two circumferential portions containing an annular reinforcing structure for anchoring the said tire on a corresponding mounting rim, and a tread band extending circumferentially around the said carcass structure with a moulded relief pattern comprising solids alternating with cavities a least in the axial direction, the said method comprising the following steps:

forming the said carcass structure,
winding, onto the said crown portion of the said carcass structure, a strip of elastomeric material in a plurality of axially consecutive turns of the said strip, until the said tread band is formed,
and placing the said tire in a curing mould and moulding and curing the said tire, the said method being characterized in that it includes the following steps:
producing the said strip with an elongate right cross section that is asymmetrical in the transverse direction;
and winding the said strip onto the said crown portion, one turn being at least partly overlapped onto the previously deposited, axially adjacent turn.

Here and in the rest of this description, a transverse direction in a right cross section means a direction perpendicular to the greatest dimension of the said right cross section.

A strip having an elongate right cross section that is asymmetrical in the transverse direction means a strip with an essentially "drop"-shaped right cross section, that is thick near one edge and tapering towards the other edge.

In particular, by depositing the said strip on a toroidal support with the greatest dimension more or less parallel to the axis of rotation of the support, it is possible to partially overlap the axially adjacent turns in such a way as to vary the thickness of the deposited layer, modifying this thickness along the axial line according to requirements.

The method according to the invention preferably includes the step of correlating together the shape of the cross section of the said strip and the amount of overlap of axially adjacent turns to form a tread band whose thickness may vary in the axial direction.

The said tread band is advantageously produced with a single relative axial displacement, in the same direction along the peripheral line of the right cross section of the toroidal support, between the said toroidal support and the said output die.

In accordance with the method according to the invention, the step of correlating the shape of the cross section of the said strip and the amount of overlap of axially adjacent turns is carried out by varying the winding pitch of the said strip.

In a preferred solution, a portion of tread band of increasing thickness is produced by reducing the said winding pitch.

Alternatively, a portion of tread band of decreasing thickness is produced by increasing the said winding pitch.

According to the invention the said correlating step produces a plurality of cavities and reliefs that substantially match the solids and hollows, respectively, of a moulding matrix for the said tread band.

In a preferred embodiment, the said strip is extruded with a right cross section having at least one taper at one edge.

In a further embodiment the said right cross section is tapered at each edge, the taper towards one edge being steeper than the taper towards the other edge.

In a second aspect the invention relates to a method for retreading a pneumatic tire, comprising the following steps: —preparing a carcass structure for the said tire, —winding, onto a crown portion of the said carcass structure, a strip of elastomeric material in a plurality of axially consecutive turns of the said strip, until a tread band is formed, —and placing the said tire in a curing mould and moulding and curing the said tire, the said method being characterized in that it includes the following steps: —producing the said strip with an elongate right cross section that is asymmetrical in the transverse direction; —and winding the said strip onto the said crown portion, one turn being at least partly overlapped onto the previously deposited, axially adjacent turn.

The said method preferably includes the step of correlating together the shape of the cross section of the said strip and the amount of overlap of axially adjacent turns to form a tread band whose thickness may vary in the axial direction.

BRIEF DESCRIPTION OF THE DRAWINGS

Other features and advantages will become clearer in the course of the following detailed description of a preferred, but not exclusive, embodiment of a method for manufacturing a tire, according to the present invention. This description will be given below with reference to the attached drawings, which are provided purely by way of indication and are therefore not restrictive. In the drawings.

DETAILED DESCRIPTION OF THE EXEMPLARY EMBODIMENTS

Figure 1:
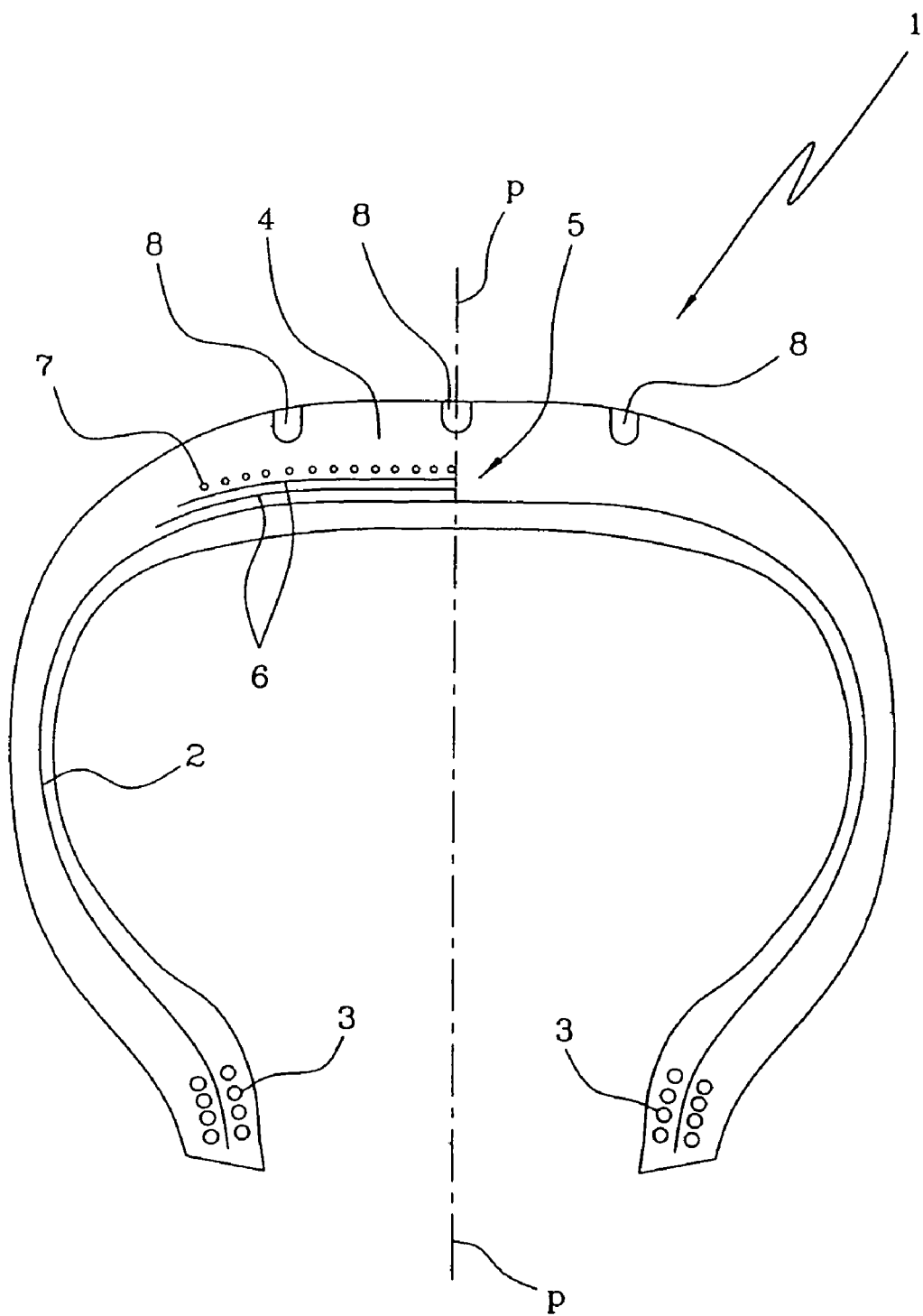
FIG. 1 is a right cross section through a tire produced using the manufacturing method according to the present invention.

Referring to FIG. 1, a radial pneumatic tire 1 comprises a carcass shaped in a toric loop containing one or more carcass plies 2 reinforced with reinforcing cords lying in radial planes, that is planes containing the axis of rotation of the tire. Each carcass ply 2 has its ends firmly attached to at least one metal annular reinforcing structure 3, usually known as the bead wire, forming the reinforcement of each bead, that is the radially inward edges of the said tire, the function of which is to enable the tire to be fitted to a corresponding mounting rim (not shown).

On the crown of the said carcass is a thick band 4 of elastomeric material, i.e. the tread band, in which a relief pattern is formed which is intended for contact with the ground such as to give the tire grip, long lie, quiet running and even wear.

Between the carcass and the tread band is a reinforcing structure usually known as the belt structure, comprising at least two radially superimposed layers 6 of rubberized fabric containing metal reinforcing cords that run parallel with each other within each layer and lie at an angle with the cords of the adjacent layer; the layers are preferably laid symmetrically with respect to the equatorial plane p-p of the tire. The said belt structure 5 preferably includes, in a radially external position, at least over the edges of the underlying layers 6, a third layer 7 of textile or metal cords wound circumferentially (at 0°). This belt structure 5 has, as is well known, the specific task of resisting those forces which, when the tire is running, arise from the inflation pressure and centrifugal force, and of maintaining the necessary driving behaviour characteristics, specifically when travelling around curves. In FIG. 1 this belt structure 5 is depicted only in part, for simplicity.

In the tread band 4 there are variously arranged grooves of which the generally circumferential grooves 8 are shown in FIG. 1 by their cross section.

Because of these grooves, the tread band varies in thickness, particularly in the transverse direction; this thickness is at its greatest between its radially outermost surface, which is that intended to contact the ground, and its radially innermost surface, in contact with the underlying components of the tire, and at its least between the bottom surface of the said grooves and the said radially innermost surface.

An example of the tire manufacturing process is explained in the aforementioned European patent application EP 928 680 by the present Applicant. Briefly, a limited number of elementary semi-finished products, as defined earlier, are fed to a toroidal support, the outer profile of which coincides with the profile of the radially innermost surface of the desired tire. The said toroidal support is passed, preferably by a robot system, between a plurality of workstations, at each of which one particular tire manufacturing step is performed, in automated sequences. In particular, the entire structure of the green tire is formed by overlapping adjacent turns of the said elementary semi-finished products on the said toroidal support.

In accordance with the invention, the liner is the first to be deposited on the said toroidal support; this basically consists of a sheet of elastomeric material which, in the cured tire, constitutes the airtight inner surface of the tire.

Next, one or more elastomeric fillers are deposited on the said toroidal support, and manufacture of the said tire 1 continues with the depositing on this toroidal support of a pair of annular reinforcing structures 3, to anchor the said tire to a mounting rim.

Once the abovementioned annular reinforcing structures 3 have been deposited, one or more carcass plies 2 are deposited to produce the carcass structure of the tire according to the invention.

Thereafter, the belt layers 6 and preferably the 0° layer 7 of textile or metal cords is deposited in succession in a radially external position on the said carcass structure to produce the belt structure 5.

At the end of the tire manufacturing process, a strip 9, 10 is wound in axially consecutive turns in a radially external position relative to the said belt structure 5, to form a tread band 4.

In accordance with the invention, the said strip has an elongate right cross section that is asymmetrical in the transverse direction. The said strip preferably has a right cross section with at least one taper towards one edge. If this right cross section is tapered on both edges, the taper towards one edge is steeper than the taper towards the other edge.

Figure 2:
FIG. 2 is a schematic view in right cross section of a strip for tire components in accordance with one embodiment of the present invention.

In a preferred embodiment, as illustrated in FIG. 2, the said strip 9 has a basically "drop"-shaped right cross section, thick near one edge and tapering towards the other edge.

This strip, which is preferably deposited on the said toroidal support with its long dimension approximately parallel to the axis of rotation of the support, allows the edges of axially adjacent turns to be overlapped in such a way as to vary the thickness of the deposited layer and so modify the dimension along the axial line according to requirements; the tread band can thus be built up with a single relative axial displacement, in the same direction along the peripheral line of the right cross section of the toroidal support, between the said toroidal support and the said output die.

Figure 3:
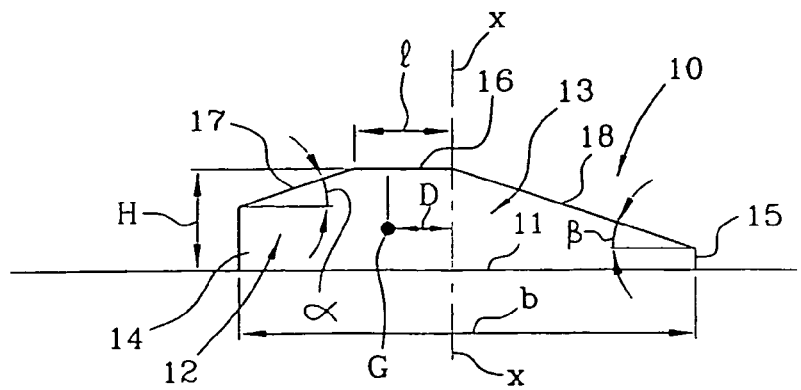
FIG. 3 shows schematically, in right cross section, a preferred embodiment of the strip according to the invention.

FIG. 3 shows another embodiment of a strip according to the invention. More precisely it shows a strip 10 whose outline is such as to inscribe or circumscribe the "drop" shape of the strip 9 of FIG. 2. The strip 10 thus possesses more or less the same geometrical characteristics as the "drop" structure of the strip 9 and it produces the same result when deposited on the said toroidal support.

The strip 10 of FIG. 3 preferably comprises a base 11 of length b and two portions 12, 13 shaped asymmetrically with respect to a vertical axis X-X that intersects the centre of the said base 11.

The strip 10 comprises a first side 14 and a second side 15 directed at right angles to the abovementioned base. The said first side 14 is preferably longer than the second.

The upper profile of the strip 10 is defined by a first straight section 16 of length l. The said first straight section 16 is preferably parallel to the abovementioned base 11. In a preferred solution, the said first straight section 16 is at a distance H from the said base 11 which is greater than the lengths of the abovementioned first and second sides 14, 15.

The said first straight section 16 is also connected to the upper edges of the abovementioned first and second sides 14, 15, by a second straight section 17 and a third straight section 18, having respective lengths $l_1$ and $l_2$.

The said second and third straight sections 17, 18 are preferably inclined in opposite directions to each other.

As is clear from FIG. 3, the shape of the cross section of the strip 10 is substantially formed by an irregular trapezium with major base 11 and minor base 16 (the latter coinciding with the said first straight section).

In particular, it should be observed that the strip 10 has the centre of gravity "G" of its cross section at a distance D from the said vertical axis X-X.

In a preferred embodiment of the invention, the Applicant has found it convenient to give the said strip 10 the specific geometrical characteristics detailed below; these may be applied either separately or in combination with each other:

the ratio l/(b/2) of the length l of the minor base 16 to one half of the length b of the major base 11 is between 0 and 0.75;

the ratio H/b of the maximum height H of the strip 10 to the length b of the major base 11 is between 0.1 and 0.2;

the ratio $l_1/l_2$ between the respective lengths of the said second and third straight sections 17, 18 is between 0.8 and 0.2;

and the ratio D/b of the said distance of the centre of gravity G of the strip 10 from the said vertical axis X-X to the length b of the major base 11 is between 0.05 and 0.3.

The length b of the major base 11 is preferably between 10 and 50 mm. The length l of the minor base 16 is preferably between 0 and 40 mm.

The said side 17 is preferably inclined with respect to the major base 11 by an angle α of between 0° and 60°. The said side 18 is inclined with respect to the major base 11 by an angle β of preferably between 0° and 30°.

The strip according to the invention is produced by an extruder located in the vicinity of the said toroidal support.

The extruder includes a port with an output die of identical shape to and slightly smaller dimensions than the corresponding cross section of the said strip.

In order better to elucidate the characteristics of the invention, reference will now be made to the operating step in which the strip, extruded by the extruder, is wound around the said toroidal support, which is moving in the axial direction and is rotating about an axis coinciding with the axis of rotation of the tire.

For simplicity of description the operating step will be described by assuming that a first turn of a strip has already been deposited at one edge of the surface of the toroidal support, and a second turn is about to be laid so as to overlap the first.

Figure 5:
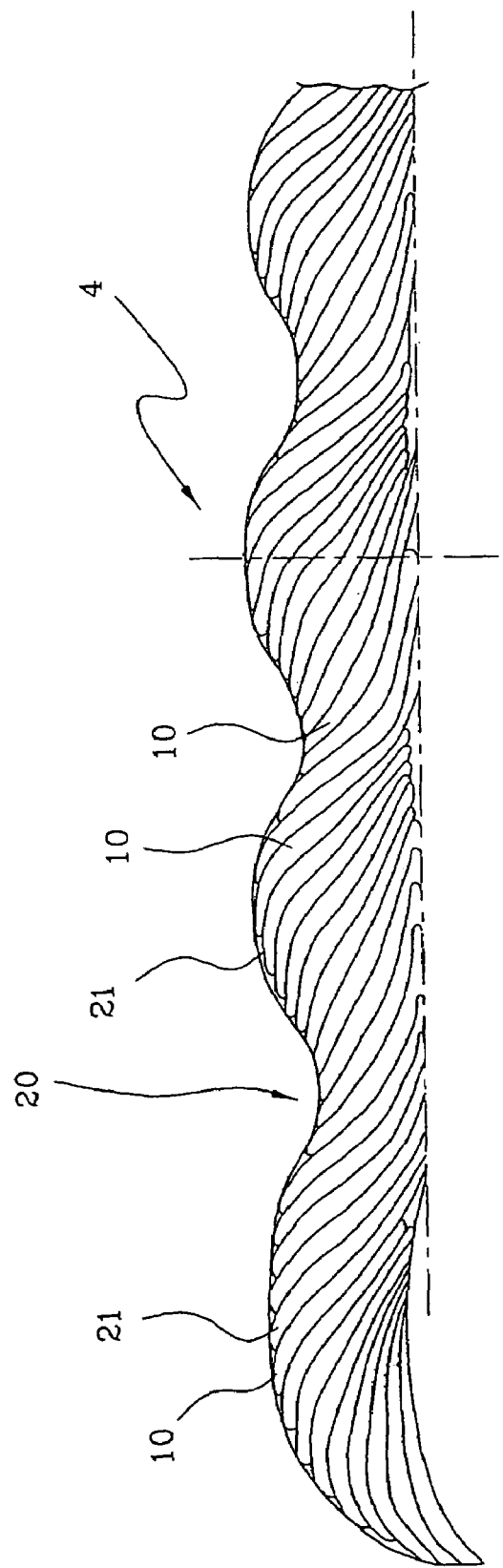
FIG. 5 is a partial view in right cross section of a tread band produced by the method according to the invention.

As illustrated in FIG. 5, the said second turn is deposited on the first turn with a predetermined axial offset of its thicker edge relative to the thicker edge of the previously deposited turn. This axial offset is produced by varying the winding pitch of the said turns.

The overlap between the first two turns is such as to greatly vary the thickness of the portion of the tread band being formed in an axially outermost position with respect to the thickness of the axially innermost portion.

By this means the method according to the invention involves a step of correlating the shape of the cross section of the said strip to the amount of overlap of axially adjacent turns in order to form a tread band whose thickness varies in the axial direction.

This correlating step is performed by varying the said winding pitch. More specifically, a reduction in the winding pitch, which results in a reduction in the axial distance of one turn from its axially adjacent partner, gives rise to a portion of tread band of increasing thickness, while an increase in the winding pitch, which results in an increase in the axial distance of one turn from its axially adjacent partner, gives rise to a portion of tread band of decreasing thickness.

According to the invention, the variation in the amount of overlap of axially adjacent turns by a variation in the winding pitch makes it possible to produce the said tread band with a variable thickness in the axial direction by a single relative axial displacement, in the same direction along the peripheral line of the right cross section of the toroidal support, between the said toroidal support and the said output die.

As illustrated in FIG. 5, during the formation of the above-mentioned tread band 4, maximum values will therefore alternate with minimum values of the thickness of the tread band, so that the said band, when finished, has a series of depressions or cavities 20 and projections or reliefs 21 substantially matching the solids and hollows of the moulding matrix.

The green tire, once manufactured in accordance with the above account, is placed in a special mould for moulding and curing.

Figure 4:
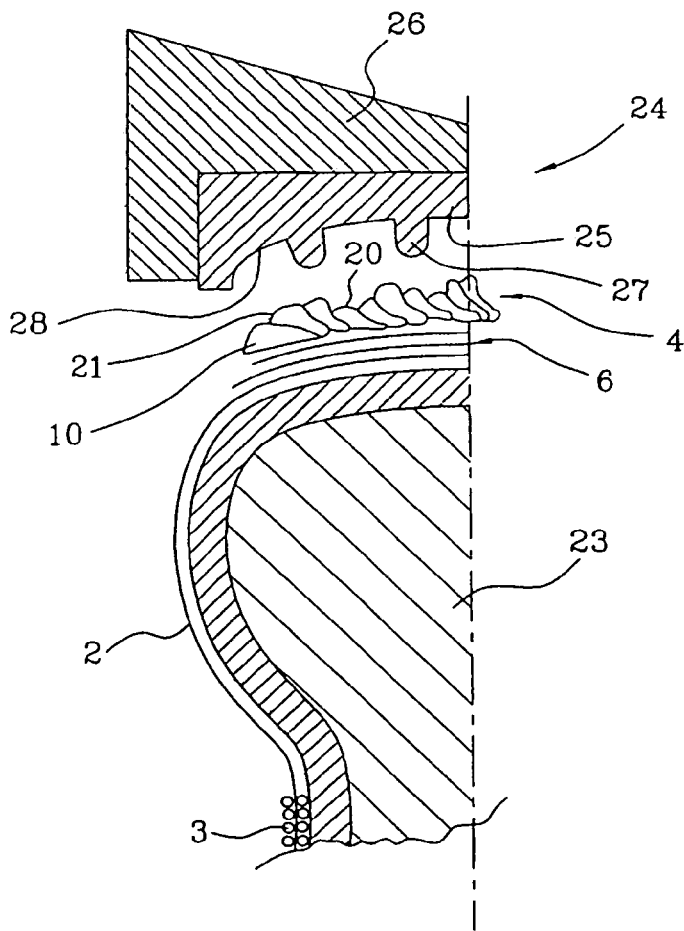
FIG. 4 is a partial view in right cross section of a tire partially enclosed in a mould.

The curing mould is preferably a centripetal mould comprising two coaxial annular side plates (not shown) which act at the side walls of the tire. As can be seen in FIG. 4, interposed between the said side plates is a ring of sectors 24 that can be moved radially in both directions relative to the axis of rotation of the tire placed in the mould, these sectors 24 comprising structural parts 26 that convert the movements of the said sectors parallel to the axis of the said mould into radial movements towards and away from the said sectors relative to the toroidal support 23.

Each sector carries a moulding matrix 25 with ribs 27 defining cavities 28 to form the tread pattern.

In FIG. 4 the mould is shown open with the matrix 25 set back from the tire. Notice that the ribs 27 of the matrix 25 are approximately aligned with the depressions 20 of the tread band that originated from the winding of the strip 10 about the toroidal support 23.

As the mould is closed, these depressions facilitate the penetration of the ribs 27 into the thickness of the tread band and bring together the reliefs 21 of the tread band 4 with the bottom surface of the matrix 25, inside the cavities 28 defined between the ribs 27, thereby giving rise to the desired tread band pattern.

By producing the tread band of a tire with the said single relative axial displacement between the said toroidal support and the said output die, the method according to the invention results in greater efficiency of the entire tire manufacturing process in terms of speed and simplicity of execution.

Furthermore, the formation of a tread band with cavities and projections accurately aligned with the solids and hollows of the moulding sectors procures the advantage of both reducing the forces required to push the ribs of the sectors into the tread band, and using compounds regarded as difficult to mould.

Finally, notice that the present method can also be used for retreading worn tires with a new tread band, thereby increasing the efficiency of this process.

The invention claimed is:

1. A method for manufacturing a pneumatic tire, comprising:
    forming a toroidal carcass structure of the tire;
    forming a tread band of the tire;
    placing the tire in a curing mould; and
    moulding and curing the tire;
    wherein the carcass structure comprises:
        a crown portion; and
        two axially opposed sidewalls;
    wherein the crown portion is defined between the sidewalls,
    wherein the sidewalls extend radially toward an axis of rotation of the tire,
    wherein each sidewall terminates in a circumferential portion comprising an annular reinforcing structure for mounting the tire on a corresponding rim,
    wherein the tread band extends circumferentially around the carcass structure,
    wherein the tread band comprises a moulded relief pattern comprising solids alternating with cavities at least in an axial direction of the tire,
    wherein forming the tread band comprises:
        producing a strip of elastomeric material; and
        winding the strip onto the crown portion of the carcass structure;
    wherein the strip comprises an elongated right cross-section that is asymmetrical in a transverse direction,
    wherein the strip is wound in a plurality of axially consecutive turns until the tread band is formed,
    wherein at least one turn is at least partly overlapped onto a previously deposited, axially consecutive turn,
    wherein a thickness of the tread band varies in the axial direction of the tire,
    wherein the shape of the right cross-section and the amount of overlap of the axially consecutive turns result in a plurality of cavities and reliefs that substantially match solids and hollows, respectively, of a moulding matrix for the tread band, and
    wherein the axially consecutive turns resulting in the plurality of cavities and reliefs are formed by winding the strip onto the crown portion via axial displacement of the strip in a single axial direction.

2. The method of claim 1, wherein the strip is extruded with a right cross-section comprising at least one tapered edge.

3. The method of claim 2, wherein the right cross-section is tapered at each edge, and
wherein the taper towards a first edge is steeper than the taper towards a second edge.

4. The method of claim 1, wherein the strip is extruded with a right cross-section of irregular trapezoidal form.

5. The method of claim 4, wherein the strip defines a right cross-section comprising a vertical axis intersecting a center of a base of the strip, wherein the vertical axis defines two side portions, and wherein one of the side portions is thicker than the other of the side portions.

6. The method of claim 4, wherein the ship is extruded with a right cross-section in which a center of gravity of the cross-section is displaced toward an edge at a predetermined distance from a vertical axis intersecting a center of a base of the strip.

7. The method of claim 1, wherein the strip is extruded with a "drop"-shaped right cross-section.

8. The method of claim 1, wherein the cavities and reliefs result from varying an amount of the axial displacement between consecutive turns of winding the strip.

9. The method of claim 8, wherein a portion of the tread band of increasing thickness is produced by reducing the winding pitch.

10. The method of claim 8, wherein a portion of the tread band of decreasing thickness is produced by increasing the winding pitch.

11. A method for retreading a pneumatic tire, comprising:
preparing a carcass structure for the tire;
winding, onto a crown portion of the carcass structure, a strip of elastomeric material in a plurality of axially consecutive turns of the strip until a tread band is formed;
placing the tire in a curing mould; and
moulding and curing the tire;
wherein the strip of elastomeric material is produced with an elongated right cross-section that is asymmetrical in a transverse direction,
wherein, during the winding, at least one turn is at least partly overlapped onto a previously deposited, axially consecutive turn,
wherein a thickness of the tread band varies in an axial direction of the tire, and
wherein the shape of the right cross-section and the amount of overlap of the axially consecutive turns result in a plurality of cavities and reliefs that substantially match solids and hollows, respectively, of a moulding matrix for the tread band
wherein the axially consecutive turns resulting in the plurality of cavities and reliefs are formed by winding the strip onto the crown portion via axial displacement of the strip in a single axial direction.

* * * * *

UNITED STATES PATENT AND TRADEMARK OFFICE
CERTIFICATE OF CORRECTION

PATENT NO. : 7,479,196 B2 Page 1 of 1
APPLICATION NO. : 10/503309
DATED : January 20, 2009
INVENTOR(S) : Lo Presti et al.

It is certified that error appears in the above-identified patent and that said Letters Patent is hereby corrected as shown below:

Claim 6, column 9, line 12, "ship" should read --strip--.

Signed and Sealed this

Thirtieth Day of June, 2009

JOHN DOLL
*Acting Director of the United States Patent and Trademark Office*